US009403537B2

(12) United States Patent
Tan

(10) Patent No.: US 9,403,537 B2
(45) Date of Patent: Aug. 2, 2016

(54) USER INPUT ACTIVATION SYSTEM AND METHOD

(71) Applicant: Nissan North America, Inc., Franklin, TN (US)

(72) Inventor: Adrian Tan, Northville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 14/978,299

(22) Filed: Dec. 22, 2015

(65) Prior Publication Data

US 2016/0107654 A1     Apr. 21, 2016

Related U.S. Application Data

(63) Continuation of application No. 14/498,797, filed on Sep. 26, 2014, now Pat. No. 9,248,839.

(51) Int. Cl.
*B60W 50/08*     (2012.01)
*B60K 35/00*     (2006.01)
*B60Q 9/00*      (2006.01)

(52) U.S. Cl.
CPC ............... *B60W 50/08* (2013.01); *B60K 35/00* (2013.01); *B60Q 9/00* (2013.01); *B60K 2350/1052* (2013.01); *B60K 2350/928* (2013.01)

(58) Field of Classification Search
CPC ......... B60W 50/08; B60Q 9/00; B60K 35/00; B60K 2350/1052; B60K 2350/928
See application file for complete search history.

(56) References Cited

U.S. PATENT DOCUMENTS

| 6,283,859 | B1 * | 9/2001 | Carlson ................... G06F 3/016 |
| | | | 188/267.1 |
| 7,019,623 | B2 | 3/2006 | Klausner et al. |
| 7,898,530 | B2 | 3/2011 | Trachte |
| 8,198,996 | B2 | 6/2012 | Golomb |
| 8,243,039 | B2 | 8/2012 | Trachte |
| 8,446,265 | B2 | 5/2013 | Golomb |
| 8,537,133 | B2 | 9/2013 | Trachte |
| 2004/0030807 | A1 | 2/2004 | Wessler et al. |
| 2005/0043877 | A1 | 2/2005 | Beneker et al. |
| 2005/0052426 | A1 | 3/2005 | Hagermoser et al. |
| 2005/0125106 | A1 * | 6/2005 | Beneker .............. B60R 16/0373 |
| | | | 701/1 |
| 2008/0183388 | A1 * | 7/2008 | Goodrich ........... A61B 5/14546 |
| | | | 701/300 |
| 2011/0187862 | A1 | 8/2011 | Ishikawa |

(Continued)

FOREIGN PATENT DOCUMENTS

| CN | 101367401 A | 2/2009 |
| JP | 2002-358162 A | 12/2002 |

(Continued)

*Primary Examiner* — Rodney Butler
(74) *Attorney, Agent, or Firm* — Global IP Counselors, LLP

(57) ABSTRACT

A user input activation method comprising operating in a deactivated mode in which a controller refrains from accepting input from a user input device, detecting a first presence condition at a first predetermined location, and detecting a second presence condition at a second predetermined location. The method further comprises changing, when the first presence condition and the second presence condition simultaneously exist, from operating in the deactivated mode to operating in an activated mode in which input from the user input device is accepted by the controller, and refraining from changing while the first presence condition and the second presence condition fail to simultaneously exist, and remaining in the activated mode while the first presence condition continues to exist.

20 Claims, 12 Drawing Sheets

(56) References Cited

U.S. PATENT DOCUMENTS

| | | |
|---|---|---|
| 2011/0246028 A1 | 10/2011 | Lisseman et al. |
| 2012/0232751 A1 | 9/2012 | Guspan |
| 2012/0296528 A1 | 11/2012 | Wellhoefer et al. |
| 2013/0076499 A1 | 3/2013 | Okita |
| 2013/0135033 A1 | 5/2013 | Fukushima et al. |
| 2013/0222304 A1 | 8/2013 | Taguchi et al. |
| 2013/0233120 A1 | 9/2013 | Golomb |
| 2013/0261871 A1 | 10/2013 | Hobbs et al. |
| 2013/0325256 A1* | 12/2013 | Taylor ............... G06F 7/00 701/36 |
| 2014/0022070 A1 | 1/2014 | Golomb |
| 2014/0121903 A1* | 5/2014 | Lee ............... B60K 35/00 701/41 |
| 2014/0152549 A1 | 6/2014 | Kim |
| 2014/0303841 A1 | 10/2014 | Fröjdh et al. |

FOREIGN PATENT DOCUMENTS

| | | |
|---|---|---|
| JP | 2013-033336 A | 2/2013 |
| JP | 2013-075652 A | 4/2013 |
| JP | 2013-079058 A | 5/2013 |
| JP | 5375747 B2 | 12/2013 |
| WO | 2007-121977 A2 | 1/2007 |
| WO | 2008-006498 A1 | 1/2008 |
| WO | 2012-062946 A1 | 5/2012 |
| WO | 2013-118608 A1 | 8/2013 |

\* cited by examiner

USER INPUT ACTIVATION SYSTEM AND METHOD

CROSS-REFERENCE TO RELATED APPLICATION

This application is a continuation of U.S. patent application Ser. No. 14/498,797, filed on Sep. 26, 2014, the entire contents of which are incorporated by reference herein.

Related subject matter is disclosed in U.S. patent application Ser. No. 14/498,747, which was filed concurrently with U.S. patent application Ser. No. 14/498,797 on Sep. 26, 2014, and the entire contents of are incorporated by reference herein.

BACKGROUND

1. Field of the Invention

The present invention generally relates to a user input activation system and method. More particularly, the present invention relates to a user input activation system and method for selectively activating a user input device based on presence conditions detected at locations within the vehicle passenger compartment.

2. Background Information

Most vehicles today include a human machine interface (HMI) system that enables occupants to provide input to different vehicle components, such as the entertainment system, temperature control system and so on. For example, various types of HMI controls, such as conventional push buttons and rocker switches, thumb wheels, joysticks, touchpads, and combinations of these devices, can be disposed at desired locations within the passenger compartment for access by the occupants. These components can be placed on the vehicle steering wheel, on the vehicle console, on the dashboard, and at any other suitable locations. Gesture input controls, similar to those employed in smartphone capacitive touch displays, can also be used as HMI controls.

SUMMARY

Recently, vehicles can be equipped with touch sensors, such as capacitive-field type touch sensors. These touch sensors can be embedded within generally fixed surfaces, such as the vehicle steering wheel, the shifter, the center console, the dashboard and so on. These devices can sense the presence of a hand or finger, and can control designated functions pertaining to the vehicle in response to the detected presence. Furthermore, multi-point gestures can also be detected by these touch sensors. Since the available space on a central portion of a vehicle steering wheel is generally limited, it is possible to place these types of touch sensors on or around the circular wheel portion of the vehicle steering to allow for ease of access by the driver. However, measures should be taken to avoid inadvertent activation of the designated functions due to inadvertent contact of the sensors by, for example, the driver or other occupants.

In view of the state of the known technology, one aspect of the present invention provides a user input activation method comprising operating in a deactivated mode in which a controller refrains from accepting input from a user input device, detecting a first presence condition at a first predetermined location, and detecting a second presence condition at a second predetermined location. The method further comprises changing, when the first presence condition and the second presence condition simultaneously exist, from operating in the deactivated mode to operating in an activated mode in which input from the user input device is accepted by the controller, and refraining from changing while the first presence condition and the second presence condition fail to simultaneously exist, and remaining in the activated mode while the first presence condition continues to exist.

BRIEF DESCRIPTION OF THE DRAWINGS

Referring now to the attached drawings which form a part of this original disclosure.

DETAILED DESCRIPTION OF EMBODIMENTS

Figure 1:
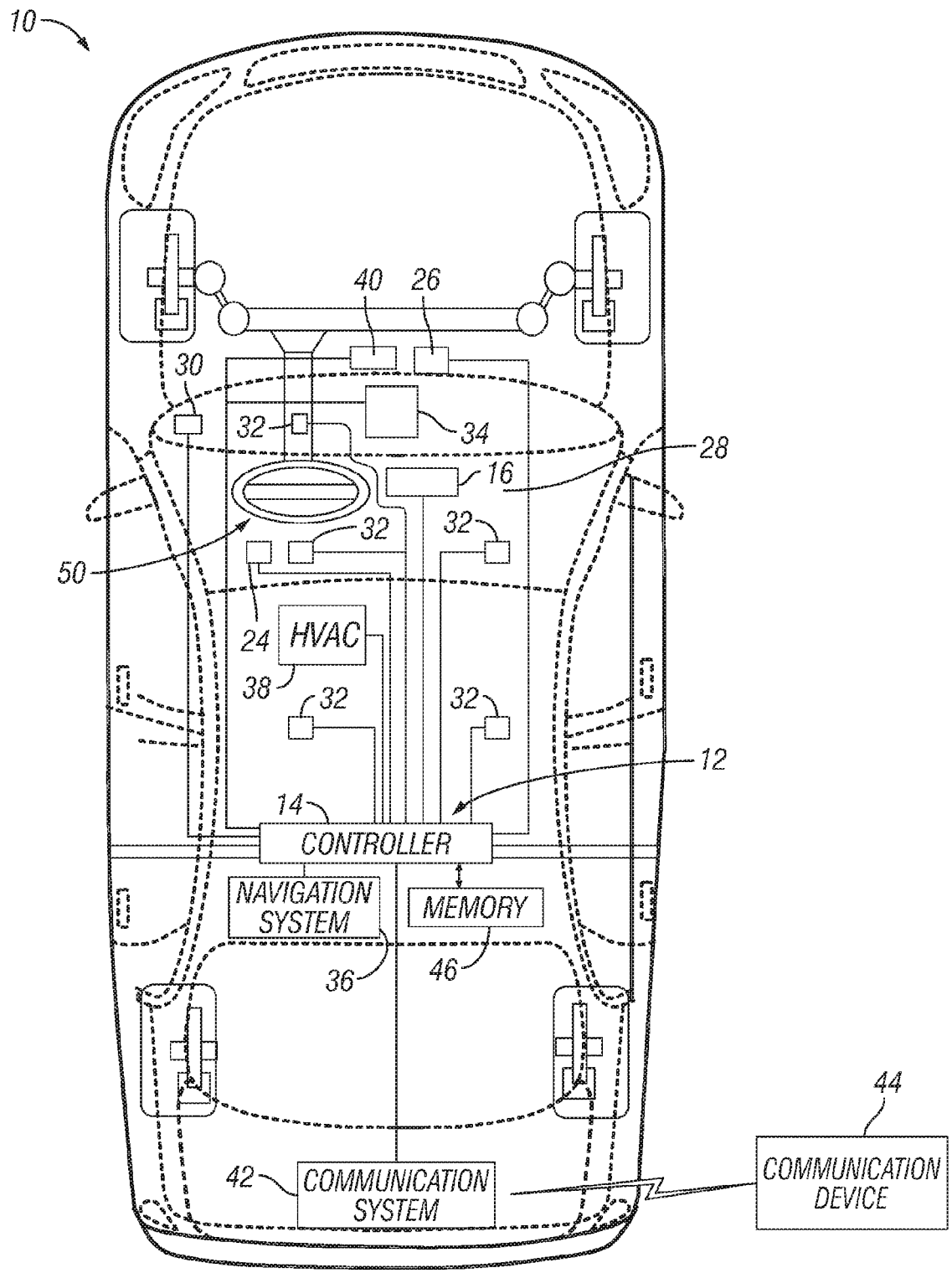
FIG. 1 is a schematic view illustrating an example of components of a vehicle interface input control system according to a disclosed embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 through 4, a vehicle 10, such as an automobile, van, truck, SUV or any other type of vehicle, can be equipped with a vehicle interface input control system 12 according to a disclosed embodiment. As shown, the vehicle interface input control system 12 includes a controller 14 that preferably includes a microcomputer with a control program that controls the vehicle interface input control system 12 as discussed herein. The controller 14 can also include other conventional components such as an input interface circuit, an output interface circuit, and storage devices such as a ROM (Read Only Memory) device and a RAM (Random Access Memory) device. The RAM and ROM store processing results and control programs that are run by the controller 14. The controller 14 is operatively coupled to the components of the vehicle interface input control system 12, and to the components of the vehicle 10 as appropriate, in a conventional manner. It will be apparent to those skilled in the art from this disclosure that the precise structure and algorithms for the controller 14 can be any combination of hardware and software that will carry out the functions of the present invention.

The vehicle interface input control system 12 further includes a plurality of sensors 16 as discussed herein. The sensors 16 can be, for example, a capacitive-field type sensor, a resistive sensor, a pressure sensor or any other suitable type of sensor having tactile sensing capabilities. The sensors 16 can also be a visual sensor or a proximity sensor which can sense the presence of an occupant's hand 18 or finger 20 (see FIG. 4) proximate to the sensors 16. The sensors 16 can further include proximity or range sensing features that can detect the proximity of one or more user wearable devices 22 or 23 (see FIG. 4), such as smart watches, to a sensor 16 or sensors 16 as discussed herein. For instance, the sensors 16 can include field strength sensors to detect for the proximity of a user wearable device 22 that can have a watch or bracelet configuration and worn around the user's wrist, as well as a user wearable device 23 that can have a ring-like configuration, such as a smart ring, and worn on one of the user's fingers 20. The user wearable device can also be configured as a key fob or any other suitable type of device or original equipment manufacturer (OEM) component. The vehicle interface input control system 12 can further detect the proximity of a user wearable device 22 or 23 or OEM component to the steering wheel based on, for example, accelerometer analysis relative to the sensors 16, radio frequency (RF) detection, near field communication (NFC) detection, and through the use of any other suitable type of proximity detection technology as understood in the art. Also, the sensor 16 or any other component can perform inductive charging of the user wearable devices 22 and 23 as understood in the art.

The vehicle interface input control system 12 can further include any suitable types of HMI controls 24, such as conventional push buttons and rocker switches, thumb wheels, joysticks, touchpads, a heads up display (HUD) and combinations of these devices, can be disposed at desired locations within the passenger compartment, such as on the steering wheel, on the shifter, on the center console, on the dashboard and so on, for access by the occupants. The vehicle interface input control system 12 can further include an imaging system 26 that can operate as an HMI control 24 as understood in the art. That is, the imaging system 26 can include any suitable type of cameras or detectors that are capable of capturing images of the passenger compartment 28 of the vehicle 10 and produce image signals that are received and acted upon by the controller 14 as discussed herein. Thus, the imaging system 26 can operate as a gesture recognition device that interprets gestures made by an occupant in the passenger compartment 28 as a particular input instructions. As understood in the art, popular gestures include a swipe gesture, a pinch gesture, a stretch gesture and a flick gesture as made by an occupant's hands. The imaging system 26 can also perform, for example, eye tracking operations to track the eye movement of an occupant and to control the input devices based on the eye movement in a manner as understood in the art. In addition, a touchpad, such as a capacitive touch screen as known in the art, can also be tuned to recognize such gestures without the need for an occupant's hand and/or finger to touch the surface of the screen to begin reacting to the hand and/or finger movement. Furthermore, components of the imaging system 26 such as cameras, detectors, touchpads and any combination of these components can be disposed at various locations about the passenger compartment, such as near or in front of the vehicle steering wheel or at or near the meter cluster displays, so that the driver could perform gestures around the steering wheel and in front of the meter cluster displays. Gesturing can also be captured by the imaging system 26 to control an HUD. Other known systems, such as Bluetooth® mobile device integration and voice recognition systems, as well as brainwave detection systems as are being developed in the art, can also be employed to provide user input.

The vehicle interface input control system 12 can further include an audio system 30 that can operate as an HMI control 24 as understood in the art. For example, the audio system 30 can be controlled by the controller 14 to receive audio commands from an occupant in the passenger compartment 28 and to provide audio feedback, messages and so on to the occupant as discussed herein. In addition, the vehicle interface input control system 12 includes a plurality of haptic devices 32 that are controlled by the controller 14 to provide haptic feedback to the occupant or occupants as discussed herein.

As can be appreciated from the description herein, a user, such as a vehicle occupant, can operate the controller 14 to select at least one of a plurality of possible contact locations as at least one of the first predetermined locations PL1, at least one of the second predetermined locations PL2, or at least one first predetermined location PL1 and second predetermined location PL2, in response to a user instruction that can be input via, for example, any of a plurality of the HMI controls 24. In addition, the controller 14 can set at least one of the first and second predetermined locations PL1 and PL2 based on a vehicle component characteristic which can include, for example, a driver seat position, a steering wheel position, an occupant detection and any combination of these conditions.

The vehicle 10 further includes a vehicle entertainment system 34, a navigation system 36, a heating ventilation and air conditioning (HVAC) system 38 and other conventional types of systems typically found in vehicles. The vehicle 10 also includes one or more visual displays 40 that display information provided from the vehicle entertainment system 34, the navigation system 36, the controller 14 and so on as discussed herein. Any or all of the visual displays 40 can also operate as an input device for the vehicle interface input control system 12, as well as a feedback device to provide visual feedback to the occupants as discussed herein. Thus, the audio system 30, the haptic devices 32, and the visual displays 40, and any combination of these components, can operate as an indicator which selectively provides an indication of an activated state or a deactivated state of the HMI controls 24 under the control of the controller 14 as discussed herein.

In addition, the vehicle 10 includes an on-board communication system 42 that is operable, for example, by the controller 14. The vehicle entertainment system 34, the navigation system 36 and so on communicates with a communication device 44, such as a transceiver, that is external to the vehicle 10. Accordingly, the communication system 42 can receive, for example, GPS or navigation information, entertainment information, information from other vehicles, and any other suitable type of information as understood in the art. The vehicle 10 further includes a memory 46 than can be accessed by the controller 14 and can store information such as driver-related information, vehicle-related information, traffic-related information, navigation information and any other suitable information as understood in the art.

Figure 2:
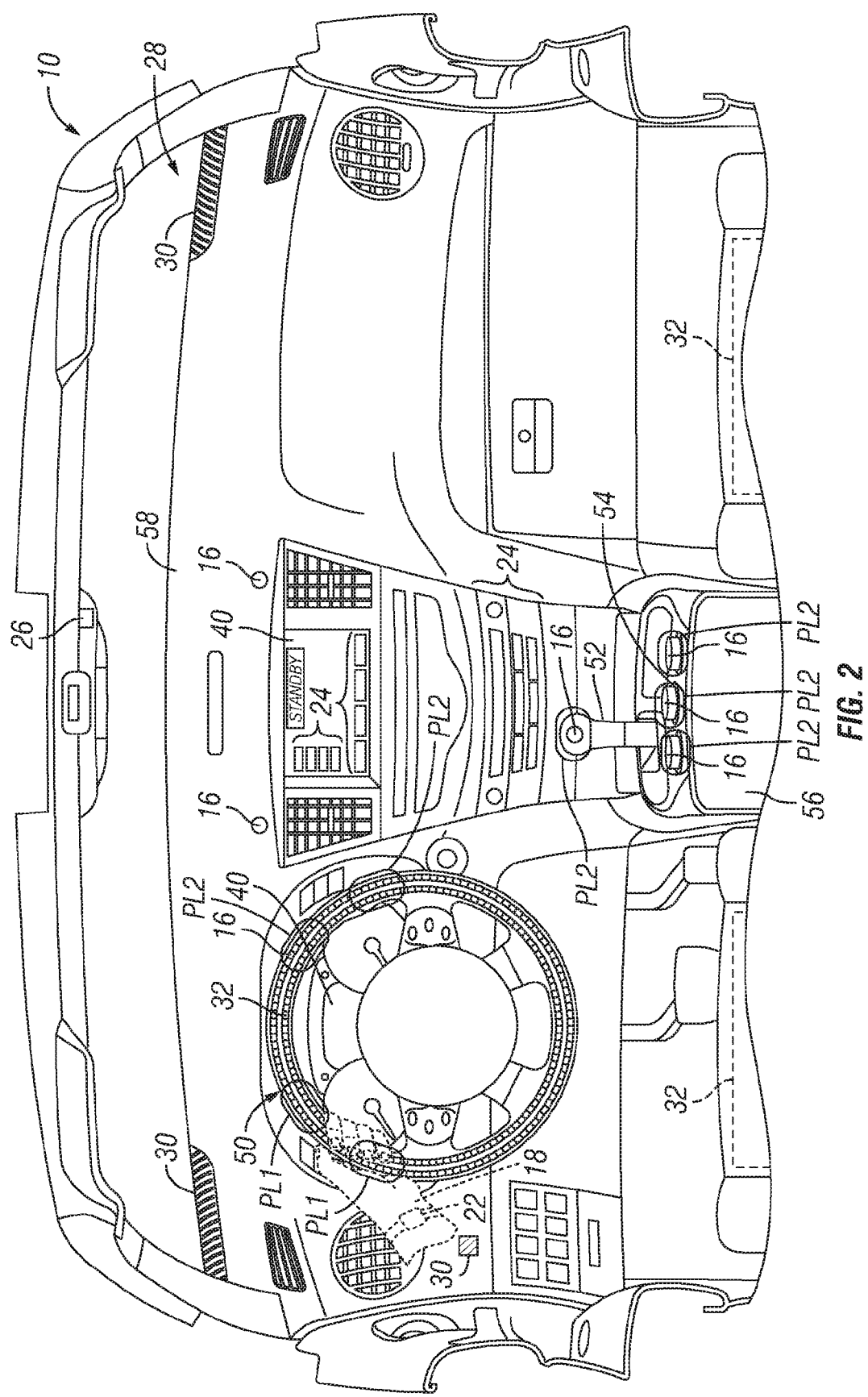
FIG. 2 illustrates a forward facing view in a passenger compartment of a vehicle including the vehicle interface input control system.
Figure 3:
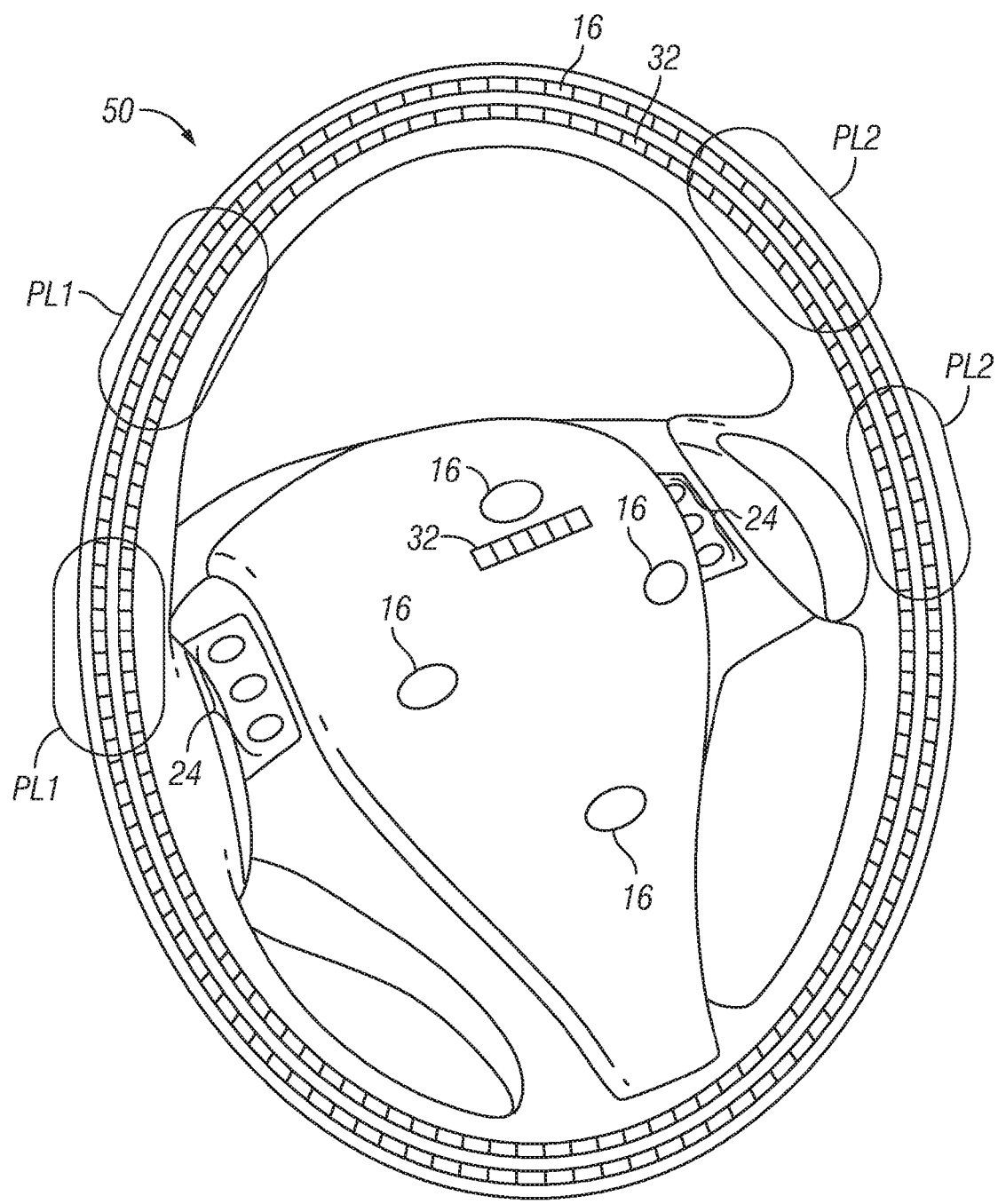
FIG. 3 is a detailed perspective view of the vehicle steering wheel of the vehicle shown in FIGS. 1 and 2.
Figure 4:
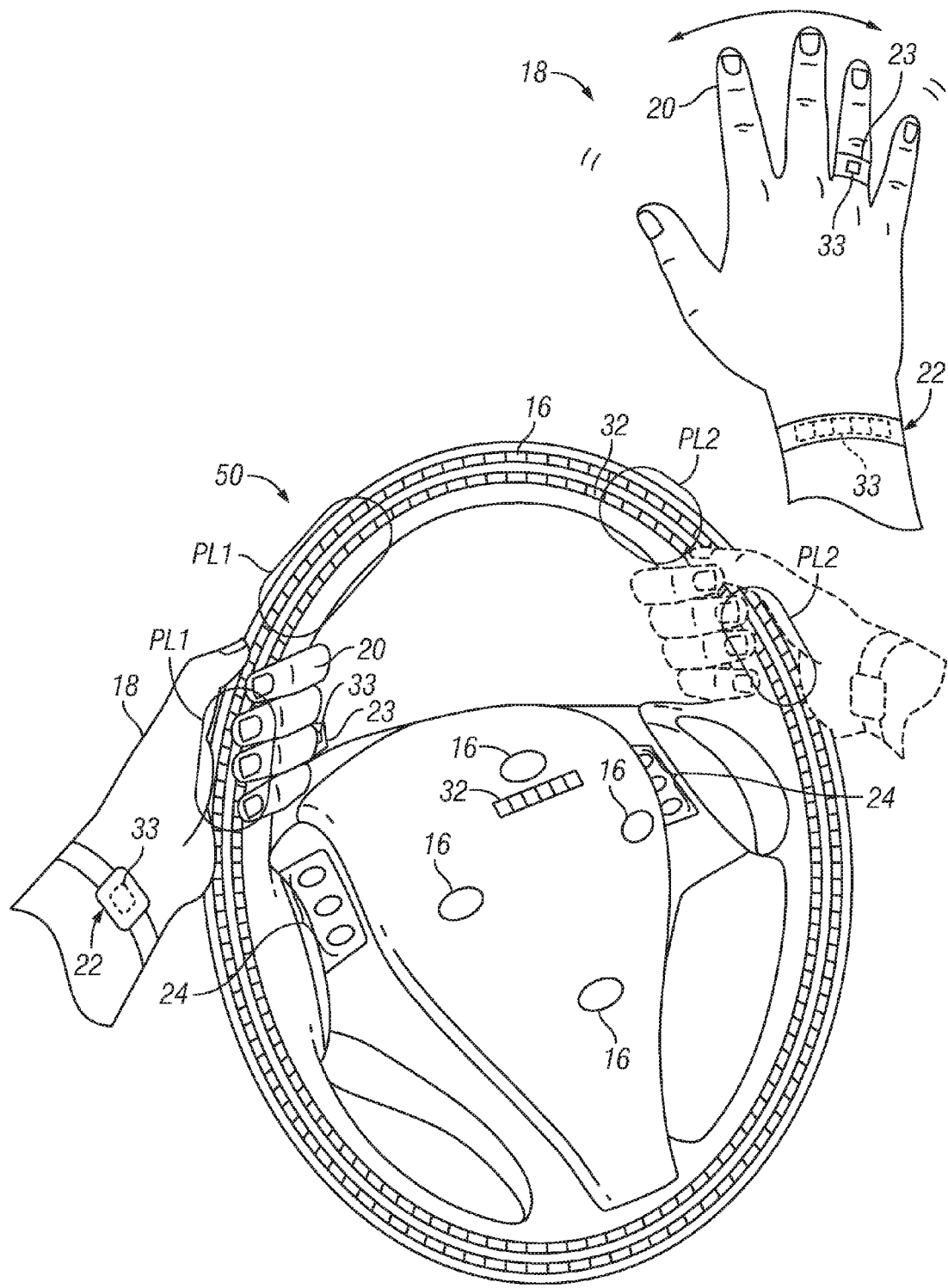
FIG. 4 is another detailed perspective view of the steering wheel which further illustrates exemplary positions of a driver's hands in relation to the steering wheel.
Figure 5A:
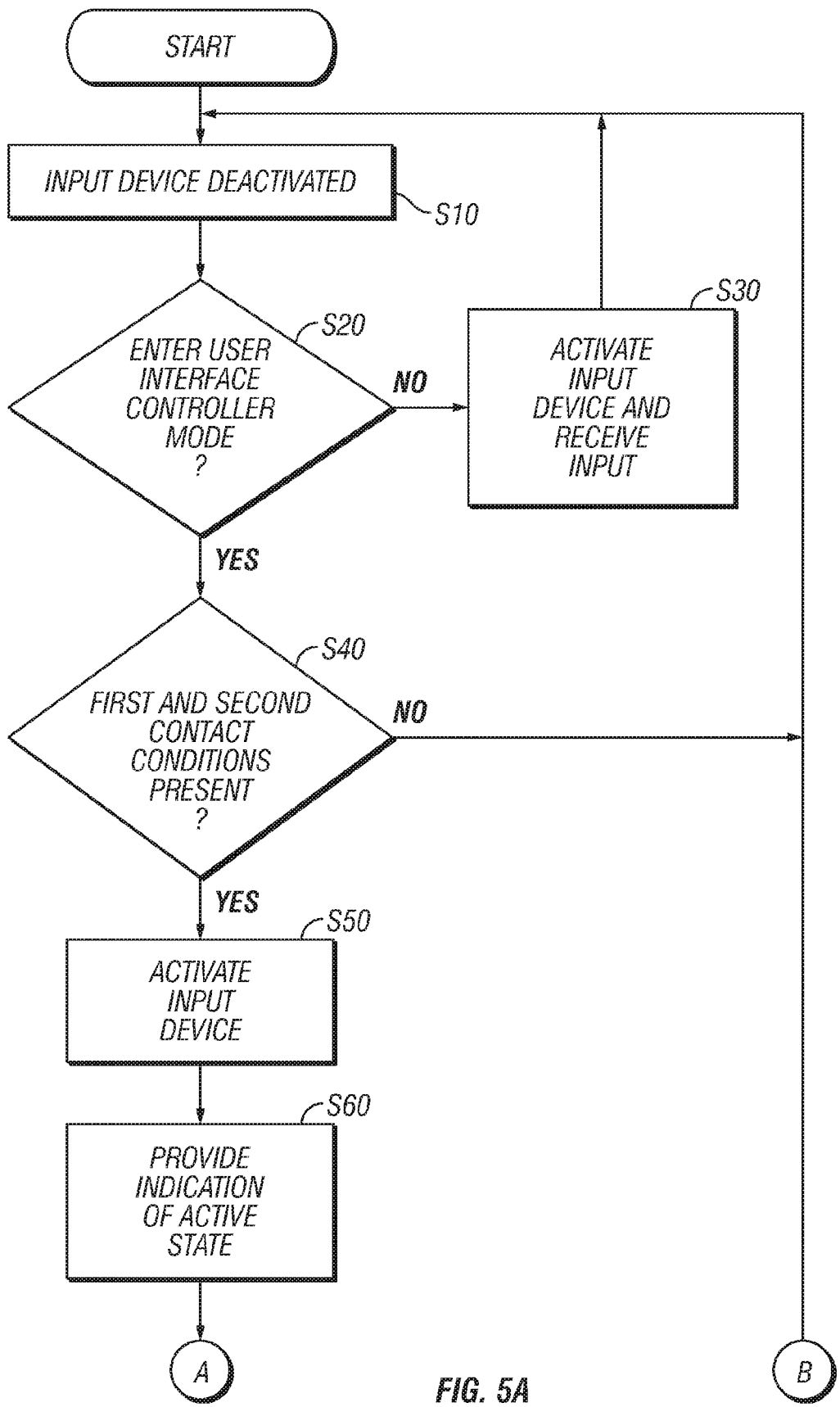
FIGS. 5A and 5B illustrate a flowchart illustrating exemplary embodiments performed by the vehicle interface input control system.
Figure 5B:
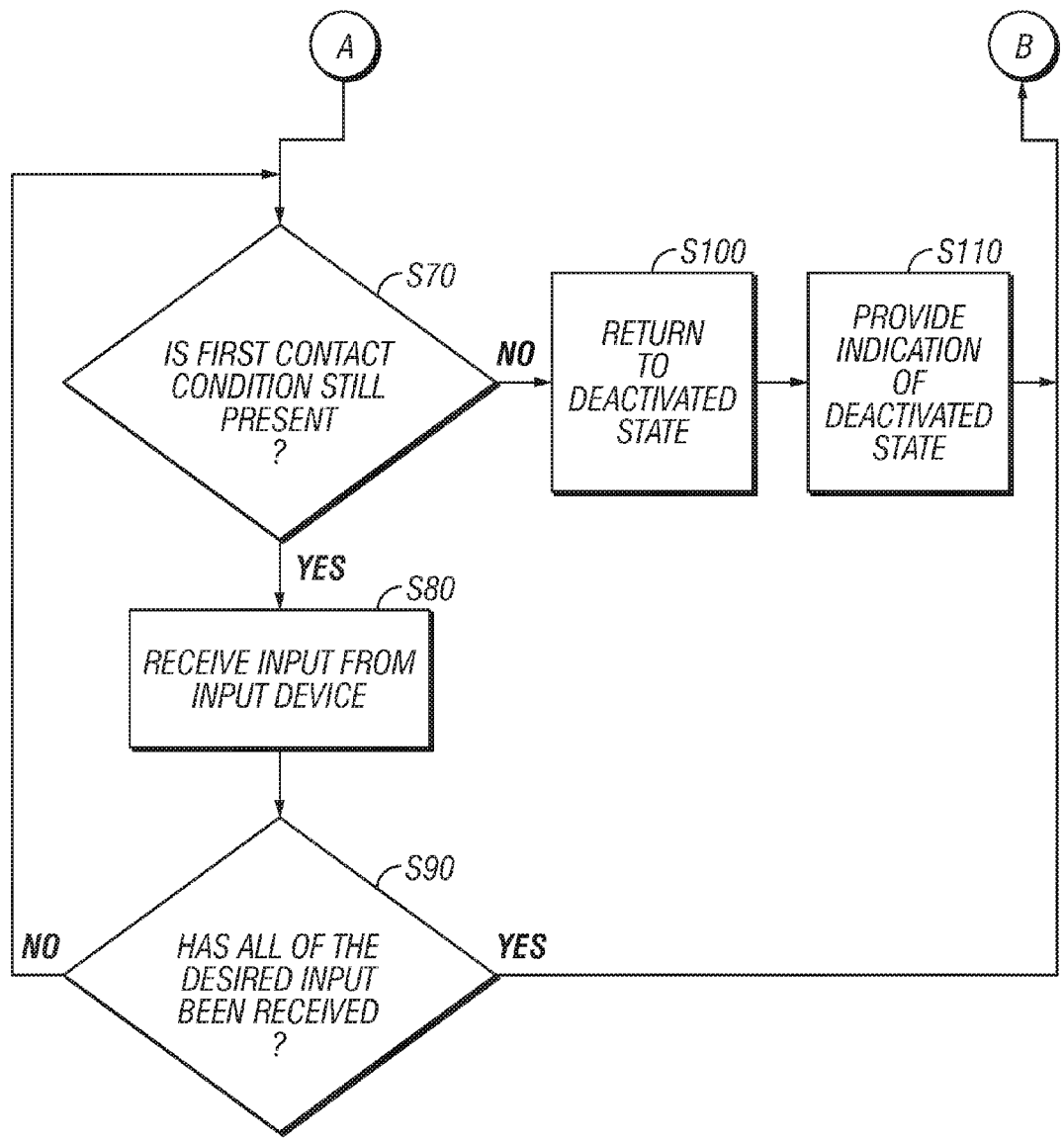

FIGS. 2 through 4 further illustrate details of the sensors 16 and haptic devices 32 employed in the vehicle interface input control system 12 according to the embodiments described herein. As shown, a plurality of sensors 16 can be disposed about the steering wheel 50 of the vehicle 10. The sensors 16 can be uniformly or non-uniformly spaced about the vehicle steering wheel 50 as appropriate. For instance, the vehicle steering wheel 50 can include individual sensors 16 that are spaced 30 degrees from each other. Alternatively, a sensor 16 can be configured a single continuous sensor that extends about a portion of the circumference of the steering wheel 50 or about the entire circumference of the steering wheel 50 as shown, for example, in FIGS. 2 through 4. Naturally, the steering wheel 50 need not be circular but can be oval-shaped, multi-sided, symmetrically or asymmetrically shaped, configured as a handle or stick type control, or have any other suitable shape. The sensors 16 and the haptic devices 32 can therefore be placed about the steering wheel 50 in any suitable manner based on the shape of the steering wheel 50. Also, the sensors 16, the haptic devices 32 or any other component in the steering wheel 50 or proximate to the steering wheel 50 can include coils or other suitable components that perform inductive charging of the user wearable devices 22 and 23 as understood in the art. The controller 14 receives signals from the respective sensors 16 indicating the presence or absence of contact at the respective sensors 16. Similarly, if the sensor 16 is configured as a single continuous sensor, the controller 14 receives signals from the sensor 16 indicating the presence or absence of contact at respective locations along the sensor 16 as understood in the art. The sensors 16 or single sensor 16 can therefore collectively be referred to herein as a contact sensor system. In addition, as discussed above, the sensors 16 can be disposed at other suitable locations within the passenger compartment 28. For instance, one or more sensors 16 can be disposed at the shifter 52, on the control puck 54, on the center console 56, on the dashboard 58, or at any other location that is accessible by a driver or passenger of the vehicle 10.

Examples of the operations of the vehicle interface input control system 12 according to the disclosed embodiments will now be described with reference to FIGS. 4 through 11. These operations can be performed, for example, by the controller 14 according to the flowchart shown in FIG. 4. That is, as the processing begins, the controller 14 is controlling the vehicle interface input control system 12 to be in a deactivated state in step S10. In the deactivated state, the controller 14 refrains from receiving input information via, for example, the HMI controls 24. Also, the controller 14 can control one or more of the indicators as discussed above to provide an indication of the deactivated state in step S10.

In step S20, the processing determines whether the controller 24 is to enter a user input device controlling mode or to refrain from entering the user input device controlling mode. As discussed in detail below, during the user input device controlling mode, the controller 24 determines whether to control the user input devices, such as any of the HMI controls 24, to enter an activated state based on the sensed presence of contact conditions (e.g., first and second contact conditions) at predetermined locations (e.g., first and second predetermined locations PL1 and PL2) in the passenger compartment 28. However, in a mode other than the user input device controlling mode, the controller 24 can control the user input devices to enter the activated state regardless of the presence or absence of the contact conditions.

It should be further noted that the term "contact condition" is not limited to physical contact, such as the physical touching of the first and second predetermined locations PL1 and PL2 by a user's hands 18. That is, as discussed above, the proximity of the user's hand 18 or finger 20 to the first and second predetermined locations PL1 and PL2, or the presence of an object such as a user wearable device 22 or 23, a key fob and so on, can be determined to be a contact condition. Furthermore, the presence of a user's hand 18 or finger 20 at a predetermined location in space within, for example, the passenger compartment 28 of the vehicle 10 can indicate the presence of the contact condition at that location. For instance, the second predetermined location PL2 can be a particular location in space within the passenger compartment 28, such as a location near one of the visual displays 40. Thus, a user gesture by the user's hand 18 or finger 20 at that second predetermined location PL2 in space can be detected by the imaging system 26 and interpreted by the controller 14 as an indication of a presence of a contact condition at the second predetermined location PL2. Also, the detection of a visual gaze by the user can be an indication of the presence of a contact condition at a location. For example, the imaging system 26 can detect a user's gaze toward a particular location within the passenger compartment, such as a particular location on one of the visual displays 40, and that particular location can be interpreted as a predetermined location, such as a second predetermined location PL2. Thus, when the imaging system 26 detects a user's gaze toward that second predetermined location PL2, the controller 14 can interpret the presence of this gaze as a presence of the contact condition at the second predetermined location PL2. Naturally, the vehicle input interface control system 12 can detect the presence of other types of stimuli, such as the detection of brainwave stimuli as being developed in the art, and audio stimuli at a microphone of the audio system 30, as the presence of a contact condition at a predetermined location, with the microphone being the predetermined location such as the second predetermined location PL2 for the detection of audio stimuli. In any event, the types of predetermined locations PL1 and PL2 and the locations of those predetermined locations PL1 and PL2, as well as the types of contact conditions, can be set by the user as desired via, for example, the controller 14 and HMI controls 24. Also, the locations of the predetermined locations PL1 and PL2, and the types of contact conditions, can be dynamically adjusted such as during driving while the user adjusts their hand positions on the steering wheel 50, the gripping pressure applied to the steering wheel 50 and so on.

Accordingly, if an occupant, such as the driver, wants to continue to use, for example, the HMI controls 24 to provide input to the controller 14 without necessarily using the vehicle interface input control system 12, the occupant can input an instruction via an HMI control 24 or in any suitable manner to control the controller 14 to refrain from entering the user input device controlling mode. For instance, the user can physically enter such an instruction by manipulating an HMI control 24. The user can also enter an instruction via the imaging system 26 using, for example, eye tracking or gazing, or via brainwave detection as is being developed in the art. Naturally, the user can enter visual or audio commands via the imaging system 26 and the audio system 30 to activate the input devices. Thus, the processing continues to step S30 during which the controller 14 activates at least one of the input devices, such as at least one of the HMI controls 24, to provide input to the controller 14 regardless of the presence or absence of the contact conditions. After the controller 14 receives the input, the processing can return to step S 10 during which the controller 14 returns the input devices (e.g., the HMI controls 24) to the deactivated state. Also, the controller 14 can control one or more of the indicators as discussed above to provide an indication of the deactivated state in step S10. The processing then continues as discussed herein.

The controller 14 can also determine in step S20 whether to enter the user input device controlling mode based on a predetermined operating condition of the vehicle 10. For example, the predetermined operating condition can represent a speed of the vehicle 10 that is less than a predetermined speed. The predetermined speed can be any suitable speed from 0 miles per hour, which indicates a stopped condition of the vehicle 10, to a speed which is acceptable for a driver or other occupant to operate the HMI controls 24. Alternatively or in addition, the predetermined condition can represent a driver workload condition that is less than a driver workload condition threshold. The driver workload condition can be ascertained based on, for example, the driver's operation of the steering wheel 50, the accelerator, the brakes, the turn signals and other vehicle devices that are indicative of driver activity and can be detected in any suitable manner as known in the art. The driver workload condition can also be ascertained based on traffic conditions, road conditions such as construction, blocked lanes, weather related conditions and so on that can be detected in any suitable manner as known in the art. Thus, when the controller 14 refrains from entering the user input device controlling mode based on the predetermined vehicle operating condition or conditions, the controller 14 controls at least one of the user input devices to change from the deactivated state to the activated state regardless of whether the contact conditions exist at predetermined locations.

The controller 14 can further determine in step S20 whether to enter the user input device controlling mode based on an identity of the driver or a passenger of the vehicle 10. For example, the controller 14 can identify a driver's identity based on identification information included in the driver's key, the driver's fingerprint as detected by any of the sensors 16, the driver's voice as detected by the audio system 30, facial recognition or visual recognition of any other types of identifying features as performed by the imaging system 26, or in any other suitable manner as understood in the art. The controller 14 can store driver-specific vehicle operating characteristics pertaining to operation of the vehicle 10 by the driver over a period of time for each specific driver in the memory 46. Accordingly, in step S20, the controller 14 can refrain from entering the user input device controlling mode while the controller 14 determines that the driver is a specific driver and based on the driver-specific vehicle operating characteristics. Thus, the controller 14 controls at least one of the user input devices to change from the deactivated state to the activated state based on the driver-specific vehicle operating characteristics regardless of whether the contact conditions exist at the predetermined locations, respectively, while the controller 14 is refraining from entering the user input device controlling mode as discussed above.

However, if the occupant wants to use the vehicle interface input control system 12 to control the HMI controls 24 to provide input to the controller 14 as described herein, the occupant can input an instruction via an HMI control 24 to control the controller 14 to enter the user input device controlling mode in step S20. Thus, the processing continues to step S40 during which the controller 14 determines whether the appropriate contact conditions are present. In this exemplary embodiment, the controller 14 operates in step S40 to determine the presence of a contact condition (a first contact condition) at a location (a first predetermined location PL1) on the vehicle steering wheel 50 and the presence of another contact condition (a second contact condition) at another location (a second predetermined location PL2) in the passenger compartment 28. The first and second predetermined locations PL1 and PL2 can be, for example, at the recommended driving positions of 3 o'clock and 9 o'clock on the steering wheel 50, 2 o'clock and 10 o'clock on the steering wheel 50, or similar recommend hand positions. The first and second predetermined locations PL1 and PL2 could also be specified by the design of the steering wheel spokes and features on the steering wheel 50 such as palm pads, steering wheel control locations, thumb rests and so on. The second predetermined location PL2 can also be at a location on the vehicle steering wheel 50. In this event, the first and second predetermined locations PL1 and PL2 are interchangeable as discussed herein. Alternatively, the second predetermined location PL2 can be a location apart from the vehicle steering wheel 50, such as a location on the shifter 52, on the control puck 54, on the center console 56, on the dashboard 58 or at any other location that is accessible by a driver or passenger of the vehicle 10. The first and second predetermined locations PL1 and PL2 can be any of a plurality of locations in the passenger compartment 28, such that detection of the first contact condition at any of the plurality of first predetermined locations PL1 and detection of the second contact condition at any of the plurality of second predetermined locations PL2 will satisfy detection of the first and second contact conditions to enter the activated state.

In addition, the controller 14 can operate one or more of the indicators, such as one or more of the haptic devices 32, to provide a haptic indication as an indication of the detection of the first contact condition at the first predetermined location PL1 and the detection of the second contact condition at the second predetermined location PL2. Additionally, the controller 14 can subsequently operate one or more of the indicators, such as one or more of the haptic devices 32, to provide a haptic indication as an indication of entering the activated state.

Furthermore, as can be appreciated from FIG. 4, the controller 14 can determine the presence of the first and second contact conditions by determining a proximity of the user wearable device 22 or 23 to the first predetermined location PL1 on the steering wheel 50 and operating the controller 14 to determine the second contact condition based on a proximity of the user wearable device 22 or 23, or another user wearable device 22 or 23, to the second predetermined location PL2. The user wearable devices 22 and 23 can include an indicator 33, such as a haptic indicator, an audio indicator, a visual indicator, or any combination of these types of indicators, which can operate to provide an indication of the first contact condition, the second contact condition, or both, at the first and second predetermined locations PL1 and PL2, respectively. Also, the indicator 33 in the user wearable devices 22 and 23 can provide an indication of the activated state and the deactivated state. For instance, the user wearable devices 22 and 23 can operate to provide the indication of the activated state as a haptic indication, an audio indication, a visual indication or a combination of these types of indications. The user wearable devices 22 and 23 can operate to provide the indication of the deactivated state in a similar manner.

In order to determine whether to control the input device, such as the HMI controls 24, to enter the activated state, the controller 14 further determines in step S40 whether an appropriate relationship exists between the presence of the first and second contact conditions at the first and second predetermined locations PL1 and PL2, respectively. For example, the controller 14 can proceed from step S40 to step S50 to control the user input device to change from a deactivated state to an activated state in response to the first and second contact conditions simultaneously existing at the first and second predetermined locations PL1 and PL2, respectively, in an appropriate or desired manner while the controller 14 is operating in the user input device controlling mode as discussed above. Basically, the controller 14 can control the user input device to change from a deactivated state to an activated state as long as at least one of the driver's hands 18 remains on the steering wheel 50. Furthermore, the controller 14 can adjust the proper positions for the driver's hands 18 on the steering wheel 50 based on on-board conditions or information received off-board via the communication system 42. Furthermore, the proper hand position may not require that both hands 18 be physically grasping the steering wheel 10. For instance, the palm of one hand 18 could be resting in the appropriate location, but the fingers 20 may not be grasping the rim of the steering wheel 50. Furthermore, the proper locations could have defined zones, and allow for deviations that may occur during steering of the vehicle 10 or while the driver adjusting for comfort.

The controller 14 can determine whether the first and second contact conditions have existed simultaneously in an appropriate manner in several ways. For instance, the controller 14 can control the user input device to change from the deactivated state to the activated state in response to the first and second contact conditions simultaneously existing at the first and second predetermined locations PL1 and PL2, respectively, followed by the controller 14 determining that the second contact condition ceases to exist at the second predetermined location PL2 after a predetermined duration of time has elapsed from when the controller 14 initially determined simultaneous existence of the first and second contact conditions at the first and second predetermined locations PL1 and PL2, respectively. That is, the controller 14 will allow the occupant to remove the presence of contact from the second predetermined location PL2 after a certain period of time so that the occupant can, for example, use their free hand to control the input device to enter input to the controller 14 while the vehicle interface input control system 12 is in the activated state. Similarly, the controller 14 can therefore control the user input device to remain in the deactivated state upon the second contact condition ceasing to exist at the second predetermined location PL2 before expiration of the predetermined duration of time. In this event, the processing can return to step S10 and repeat as discussed above.

Naturally, if the first and second predetermined locations PL1 and PL2 are both on the steering wheel 50, the first and second predetermined locations PL1 and PL2 can be interchangeable. For instance, the controller 14 can initially consider the presence of the driver's left hand 18 on the steering wheel 50 as the first contact condition at the first predetermined location PL1 and the presence of the driver's right hand 18 on the steering wheel 50 as the second contact condition at the second predetermined location PL2. If the driver's left hand 18 then is removed from the steering wheel 50 to, for example, operate a user input device, the controller 14 can then consider the presence of the driver's right hand 18 on the steering wheel 50 as the first contact condition and the absence of the driver's left hand 18 on the steering wheel 50 as an indication of the absence of the second contact condition. Hence, as long as one of the driver's hands 18 remains on the steering wheel 50, the controller 14 can allow the user input device to remain in the activated state.

As a practical matter, since many of the user input devices are typically to the right of the driver, the driver will typically use their right hand 18 to control the user input devices. Thus, the second contact condition will typically relate to the presence or absence of the driver's right hand 18 at the second predetermined location PL2. However, as explained above, the controller 18 can change the first and second predetermined locations PL1 and PL2 as necessary or desired.

It should also be noted that in addition to the physical location of the hands 18, or as an alternative to the physical location of one of the hands 18, the vehicle interface input control system 12 can use another type of input to confirm driver attentiveness to determine whether to place the user input devices in the activated state. For example, as discussed above, the imaging system 26 can perform eye tracking operations, and the vehicle interface input control system 12 can use this eye-tracking to determine current focus of the driver. This can also help to resolve any possible ambiguities in the presence or absence of the driver's hands 18 at the predetermined locations, especially the second predetermined location PL2. For example, if the presence or absence of the contact condition at one or more of the predetermined locations PL1 and PL2 is indeterminate, the results of the eye-tracking can determine whether the driver is engaged in driving and/or glancing between the roadway and any of the visual displays 40 to determine whether to change the user input devices from a deactivated state to an activated state and vice-versa. Alternatively or in addition, the vehicle interface input control system 12 can be configured to accept a manual command, such as the physical manipulation of an HMI control 24, a voice command, and so on, to instruct the vehicle interface input control system 12 to change the user input devices from a deactivated state to an activated state and vice-versa. Furthermore, the controller 14 need not change all of different types of input devices from the activated state to the deactivated state and vice-versa in unison. Thus, depending on the presence or absence of the contact condition at the predetermined locations PL1, PL2, or both, the controller 14 can change some of the input devices to the activated state while maintaining other of the input devices in the deactivated state, and vice-versa. For example, the controller 14 can change the audio or visual inputs to the activated state while maintaining the manual inputs and gesture inputs in the deactivated state if the controller 14 determines based on conditions such as driver workload, vehicle speed, traffic, weather and any other suitable factors that certain types of inputs should remain in the deactivated state.

Once the controller 14 has controlled the user input device to change from a deactivated state to an activated state in step S50, the controller 14 can control the one or more of the indicators in step S60 to provide an indication of entering the activated state while the user input device, such as one or more of the HMI controls 24, is in the activated state. For instance, the controller 14 can operate one or more of the haptic devices 32 to provide the indication of the activated state, and can also operate the audio system 30, the visual displays 40 or a combination of any of these devices to provide an indication of the activated state. For instance, the controller 14 can simply dim the video displays 40 for a brief period to provide an indication of the activated state, the switching between the activated and deactivated states, and so on. The controller 14 can provide these indications simultaneously while controlling the user input device to change from the deactivated state to the activated state, or can provide these indications at any suitable time after changing the user input device from the deactivated state to the activated state.

While the user input device is in the activated state, the controller 14 determines in step S70 whether the first contact condition continues to exist at the first predetermined location PL1. Thus, the controller 14 maintains the user input device in the activated state while the controller 14 determines that the first contact condition continues to exist at the first predetermined location PL1. In step S80, the controller 14 controls the user input device to provide input to the controller 14 in the activated state.

The controller 14 can operate one or more of the indicators to provide an indication of each input. For example, the controller 14 can operate at least one of the haptic devices 32 to provide a respective haptic indication of each input received by the user input device. Alternatively or in addition, the controller 14 can control at least one of the visual displays 40 to provide a visual indication of each input. Alternatively or in addition, the controller 14 can control the audio system 30 to provide an audio indication of each input. The controller 14 can provide any or all of these types of indications simultaneously with each input received. Also, any of the types of inputs discussed herein, such as physical operations of HMI devices 24, gesture inputs, eye tracking inputs, brainwave inputs and so on, can be used to provide input to the vehicle interface input control system 12.

Furthermore, the controller 14 can provide these types of indications in a manner related to the type of input received. For instance, if the input is a gesture such as a swipe on a touchpad or an open-air gesture, the controller 14 can control one or more of the indicators to provide a suitable input representative of this type of gesture. For example, if the gesture is a right to left swipe, the controller 14 can control an array of indicators of the haptic devices 32 on the steering wheel 50 to be energized from the right of the array to the left of the array, thus giving the driver the sensation that the motion is from right to left. Likewise, if the gesture is from left to right, the controller 14 can control the array of indicators of the haptic devices 32 on the steering wheel 50 to be energized from the left of the array to the right of the array, thus giving the driver the sensation that the motion is from the left to the right. The controller 50 can also operate the array of indicators of the haptic devices 32 on the steering wheel 50 to represent gestures in the vertical direction, such as up and down, and gestures in various diagonal directions. The controller 50 can also operate the haptic devices 32 at other locations in the vehicle 10, such as in the seats, to provide haptic indications of these gestures. The controller 14 can also operate the audio system 30 and the visual displays 40 to provide further indication of the type of gesture.

Figure 6:
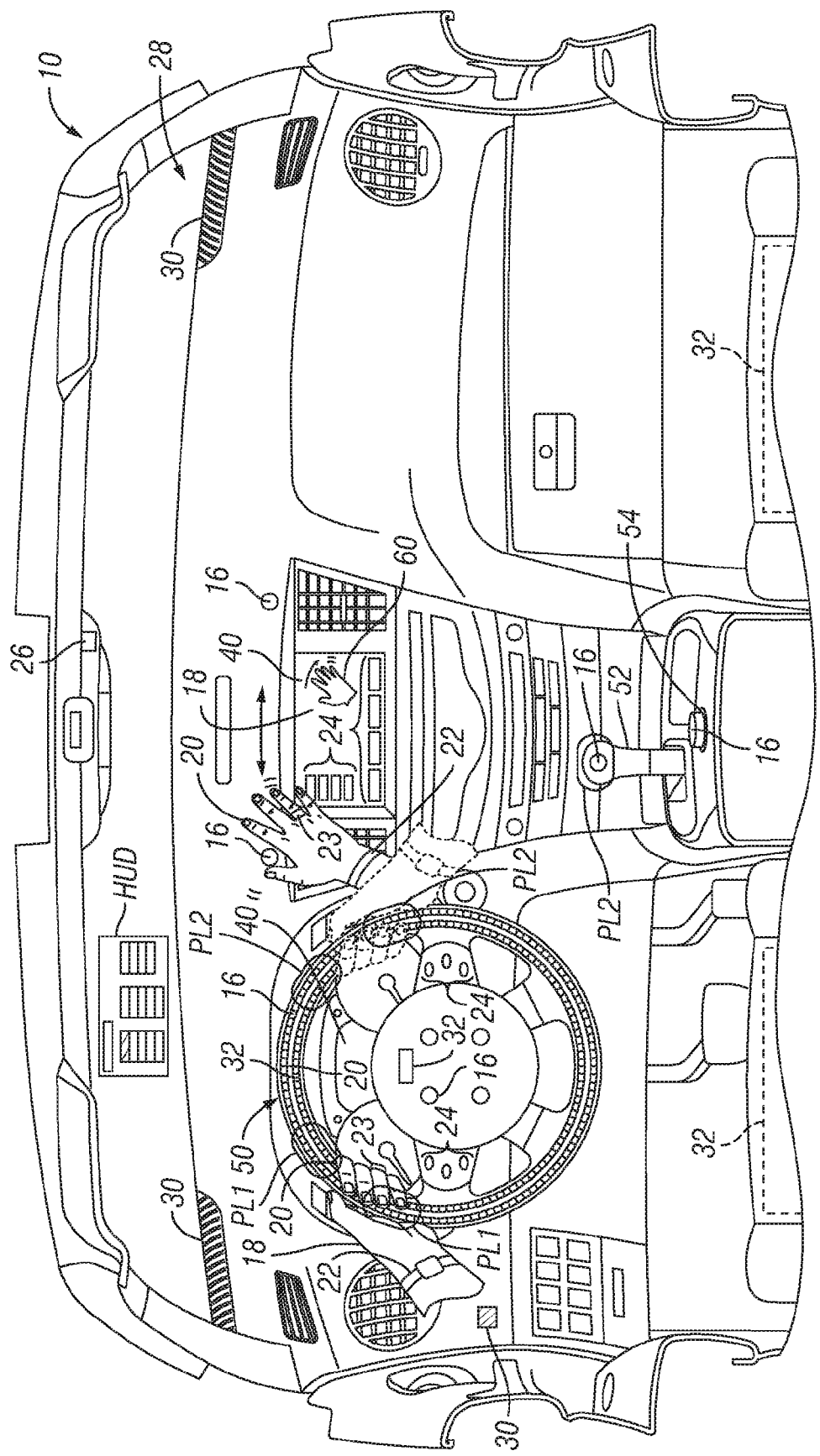
FIG. 6 illustrates another forward facing view in a passenger compartment of the vehicle including an exemplary illustration of the driver's hands.

FIGS. 6 through 11 illustrate examples of the manner in which the controller 14 controls the input devices based on the gestures. For example, as shown in FIG. 6, the controller 14 can control, for example, the visual display 40 to provide an example of a type of gesture 60, such as a swipe, that an occupant can enter to provide input. The occupant can then mimic that gesture to provide an input at the user input. Thus, the controller 14 can control the user input to indicate that the input device is ready to accept gestures and to assist in instructing an occupant about what types of gestures can be accepted for input.

Figure 7:
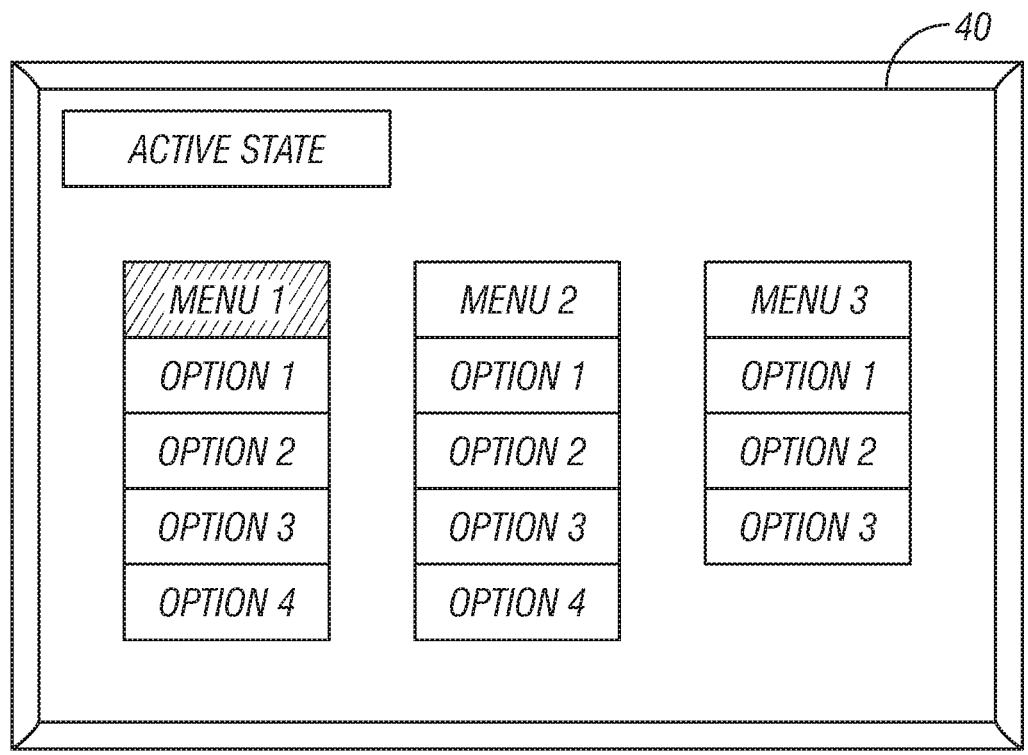
FIGS. 7-11 illustrate examples of gesture input operations that can be performed using the vehicle interface input control system.
Figure 7:
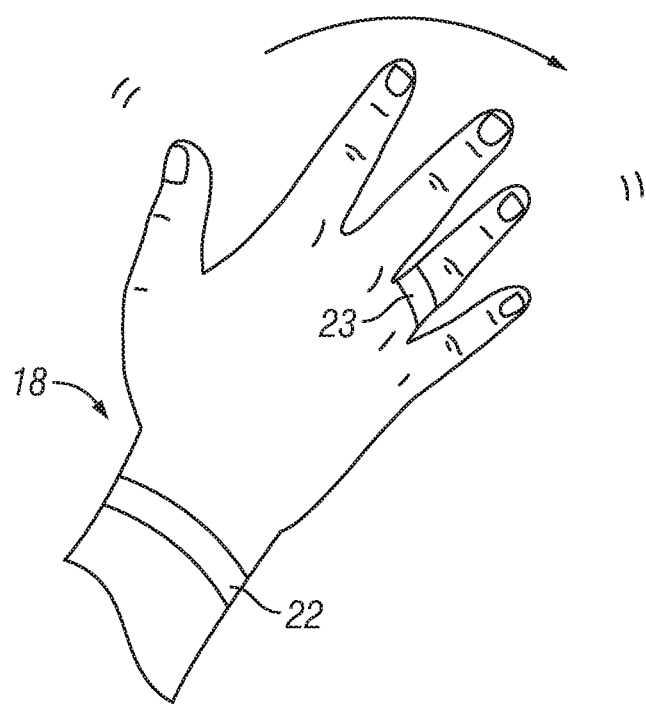
Figure 8:
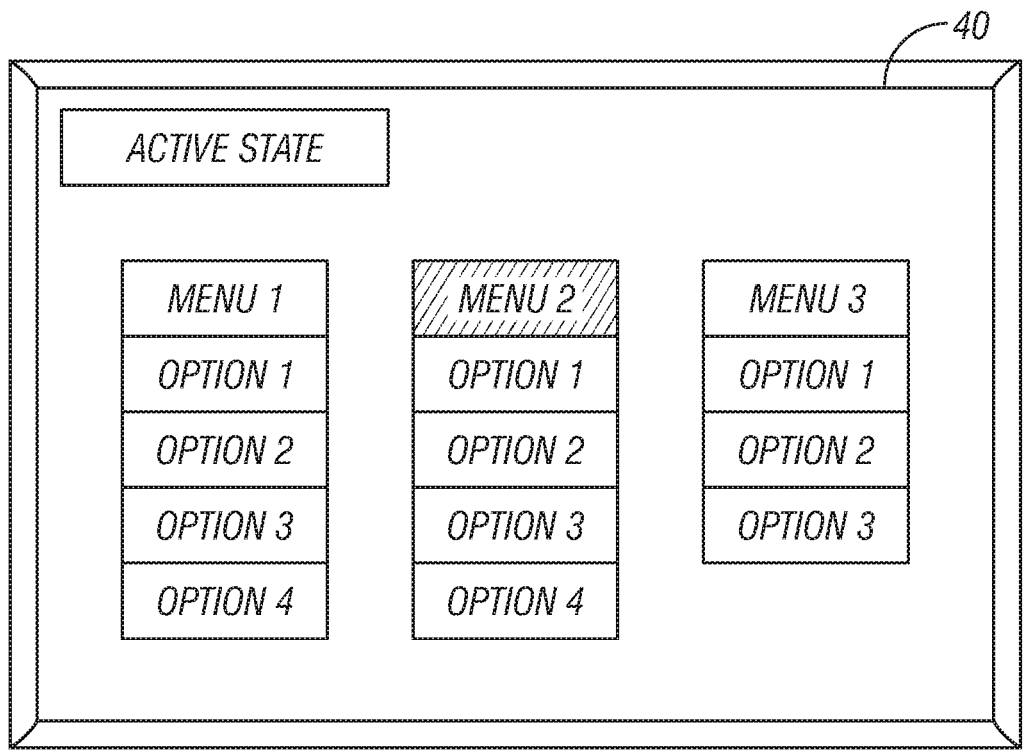
Figure 8:
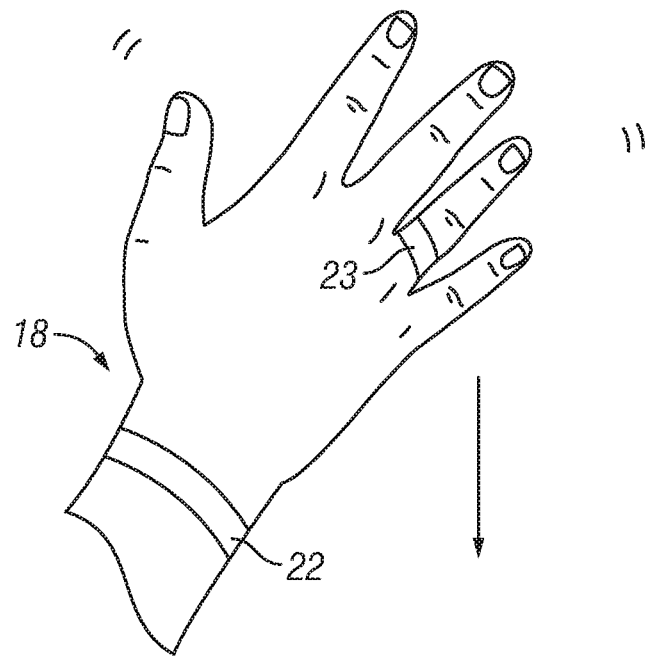
Figure 9:
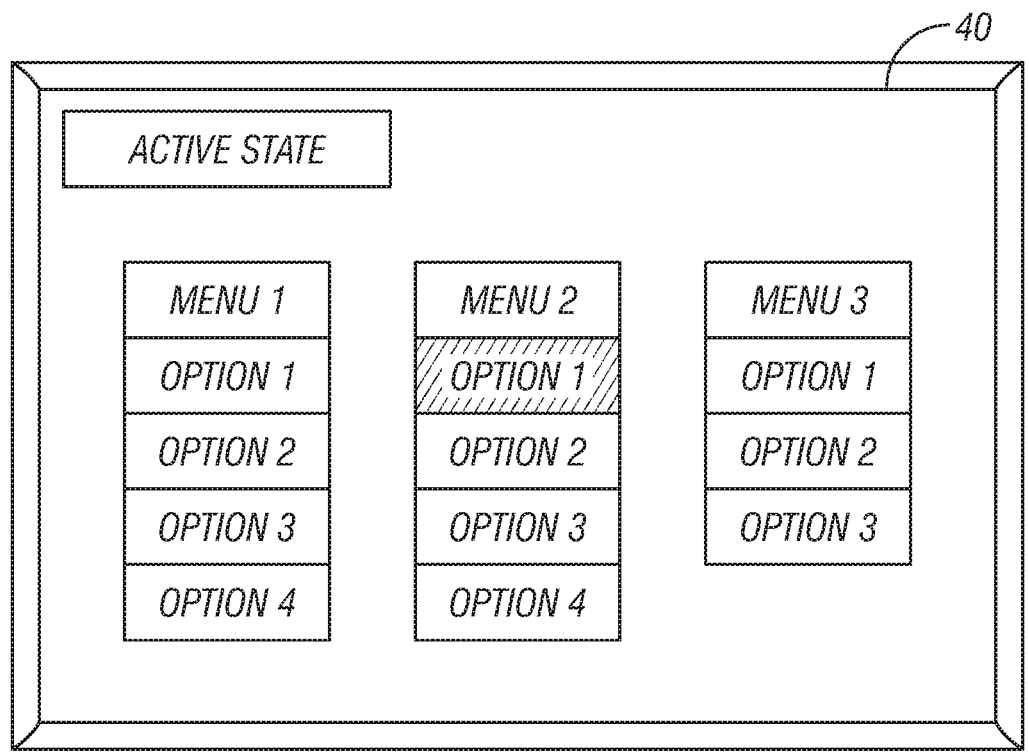
Figure 9:
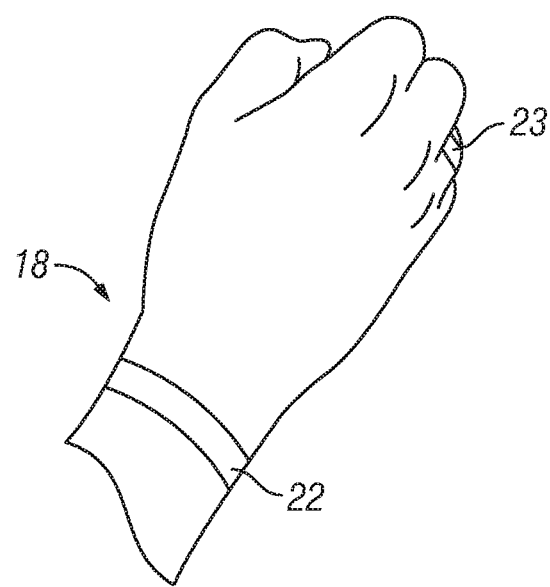
Figure 10:
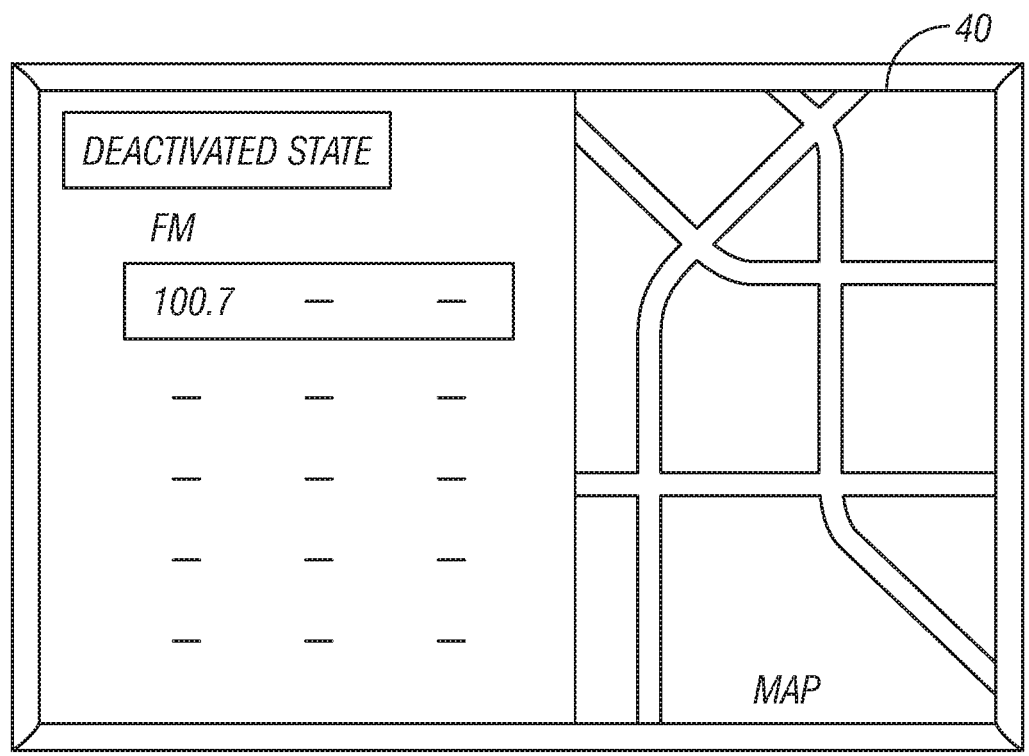
Figure 10:
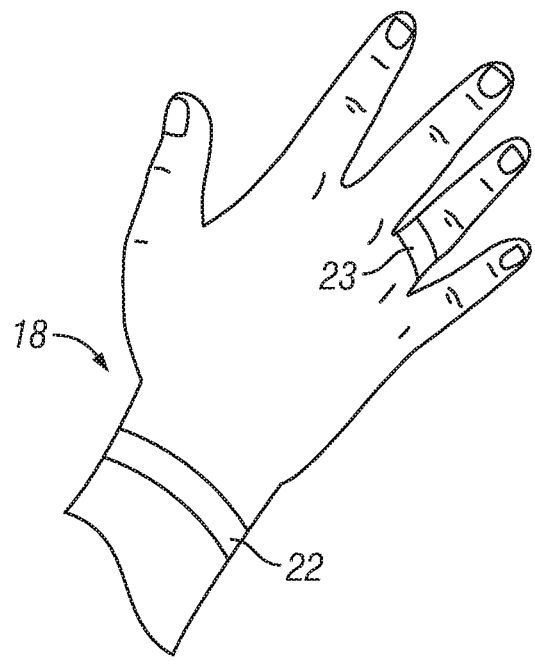
Figure 11:
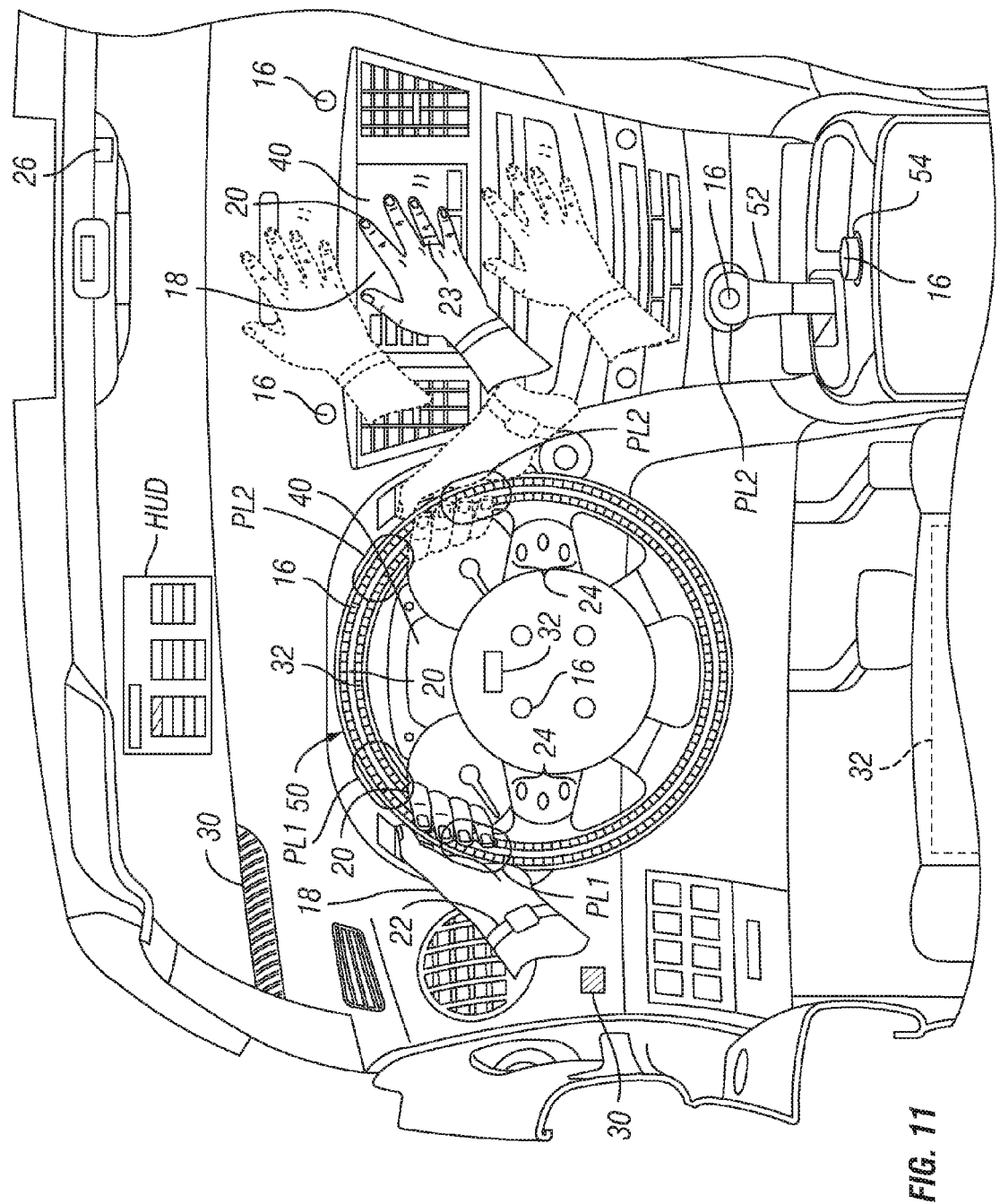

For instance, as shown in FIG. 7, the visual display 40 indicates that the input device is in the activated state and the cursor is at the top of Menu 1 on the left of the screen. If the user gestures to the right, the controller 14 can move the cursor to the top of Menu 2 which is the next menu to the right. If the user gestures down, the controller 14 can move the cursor down one entry in Menu 2 as indicated in FIG. 9. The controller 14 can also operate the indicators as discussed herein to indicate these gestures and user inputs.

The controller 14 then determines in step S90 whether all of the desired input has been received. If all of the desired input has not yet been received, the processing returns to step S70 and repeats as discussed above. However, if all of the desired input has been received, the processing returns to step S10 during which the controller 14 controls the user input device to return to the deactivated state after receiving the desired input from the user input device. Thus, as shown, for example, in FIG. 10, the controller 14 can control the visual display 40 to indicate the return to the deactivated state where user gestures are no longer received as input. As discussed above, the controller 14 can also control at least one of the indicators to indicate that the user input device has returned to the deactivated state. An indication of the deactivated state can also simply be the lack of the user input devices responding to inputs from a user Turning back to step S70, if the controller 14 determines in step S60 that the first contact condition ceases to exist at the first predetermined location PL1 as discussed herein, the processing continues to step S100 during which the controller 14 controls the user input device to return from the activated state to the deactivated state, and controls the indicators in step S110 to provide an indication of the return to the deactivated state as discussed herein. The processing then returns to step S10 and repeats as discussed above. Naturally, in addition to the operations discussed herein, the controller 14 can control the user input devices to return from the activated state to the deactivated state for reasons such as a sudden increase in driver workload, a change in vehicle conditions or road conditions, and for any other suitable reason.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A user input activation method comprising:
   operating a controller in a user input deactivated mode in which the controller refrains from accepting input from a user input device;
   detecting by the controller a first presence condition at a first predetermined location;
   detecting by the controller a second presence condition at a second predetermined location;

changing the controller, when the first presence condition and the second presence condition simultaneously exist, from operating in the user input deactivated mode to operating in a user input activated mode in which input from the user input device is accepted by the controller, and refraining from changing the controller from the user input deactivated mode to the user input activated mode while the first presence condition and the second presence condition fail to simultaneously exist; and maintaining the controller in the user input activated mode while the first presence condition continues to exist.

2. The user input activation method according to claim 1, further comprising changing the controller from the user input activated mode to the user input deactivated mode upon the first presence condition ceasing to exist.

3. The user input activation method according to claim 1, further comprising changing the controller from the user input activated mode to the user input deactivated mode upon acceptance of a user input from the user input device.

4. The user input activation method according to claim 3, wherein the user input is a gesture.

5. The user input activation method according to claim 4, further comprising providing an indication of the activated mode by demonstrating the gesture which is recognizable as the user input by the user input device.

6. The user input activation method according to claim 3, wherein the user input is a manual input.

7. The user input activation method according to claim 3, wherein the user input is one of a single input and a plurality of inputs.

8. The user input activation method according to claim 1, wherein the first predetermined location is on a steering wheel.

9. The user input activation method according to claim 1, wherein the first presence condition is a direct contact condition with the first predetermined location.

10. The user input activation method according to claim 9, wherein the first predetermined location is on a steering wheel.

11. The user input activation method according to claim 1, wherein the second presence condition is a direct contact condition with the second predetermined location.

12. The user input activation method according to claim 11, wherein the second predetermined location is on a steering wheel.

13. The user input activation method according to claim 11, wherein the second predetermined location is on a transmission position selector.

14. The user input activation method according to claim 11, wherein the second predetermined location is spaced apart from the steering wheel.

15. The user input activation method according to claim 1, wherein at least one of detecting the first presence condition and detecting the second presence condition comprises detecting by the controller a proximity of a user wearable device to a respective one of the first predetermined location and the second predetermined location.

16. The user input activation method according to claim 1, further comprising providing an indication of the deactivated mode upon returning to the deactivated mode.

17. The user input activation method according to claim 1, further comprising setting at least one of the first and second predetermined locations based on a vehicle component characteristic including at least one of driver seat position, steering wheel position and occupant detection.

18. The user input activation method according to claim 1, further comprising operating a haptic indication device to provide an indication of entering the activated mode.

19. The vehicle interface system according to claim 1, wherein the detecting of the second presence condition at the second predetermined location includes detecting by the controller at least one of a physical presence of an object proximate to the second predetermined location, a presence of a visual characteristic directed toward the second predetermined location and a presence of an audio characteristic received at the second predetermined location.

20. A user input activation method comprising:

a contact sensor system including a first sensor configured to detect a first presence condition at a first predetermined location and a second sensor configured to detect a second presence condition at a second predetermined location; and a controller configured to operate in a user input deactivated mode in which the controller refrains from accepting input from a user input device, change from operating in the user input deactivated mode to operating in a user input activated mode in which the controller accepts input from the user input device when the controller determines that the first presence condition and the second presence condition simultaneously exist and refrain from changing from the user input deactivated mode to the user input activated mode while the first presence condition and the second presence condition fail to simultaneously exist, and remain in the user input activated mode while the controller determines that the first presence condition continues to exist.

* * * * *